March 21, 1967     K. WANDEL     3,310,241
WASTE DISPOSAL UNIT
Filed Oct. 1, 1963     4 Sheets-Sheet 1
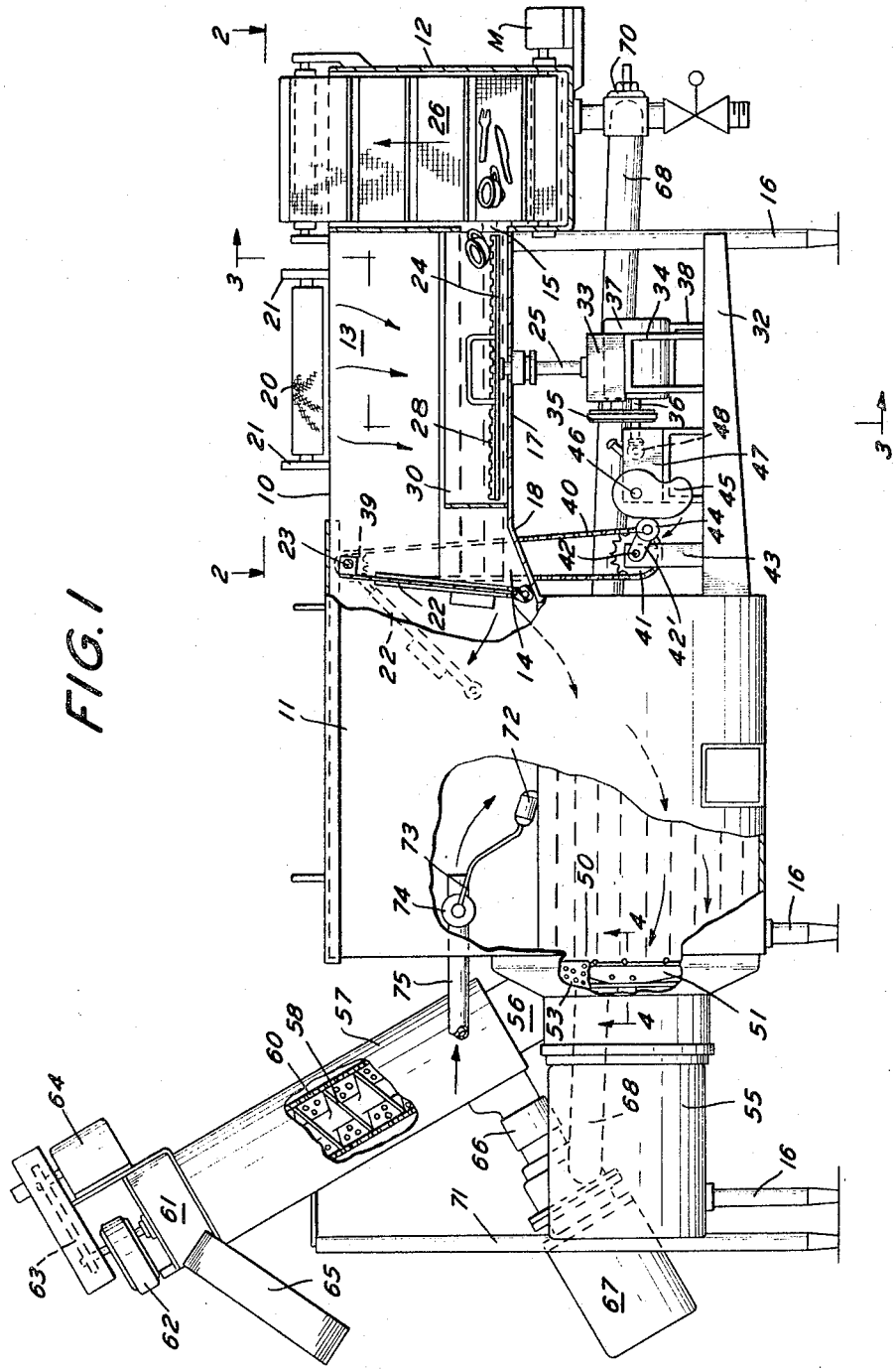
INVENTOR.
KURT WANDEL March 21, 1967 K. WANDEL 3,310,241
WASTE DISPOSAL UNIT
Filed Oct. 1, 1963 4 Sheets-Sheet 2
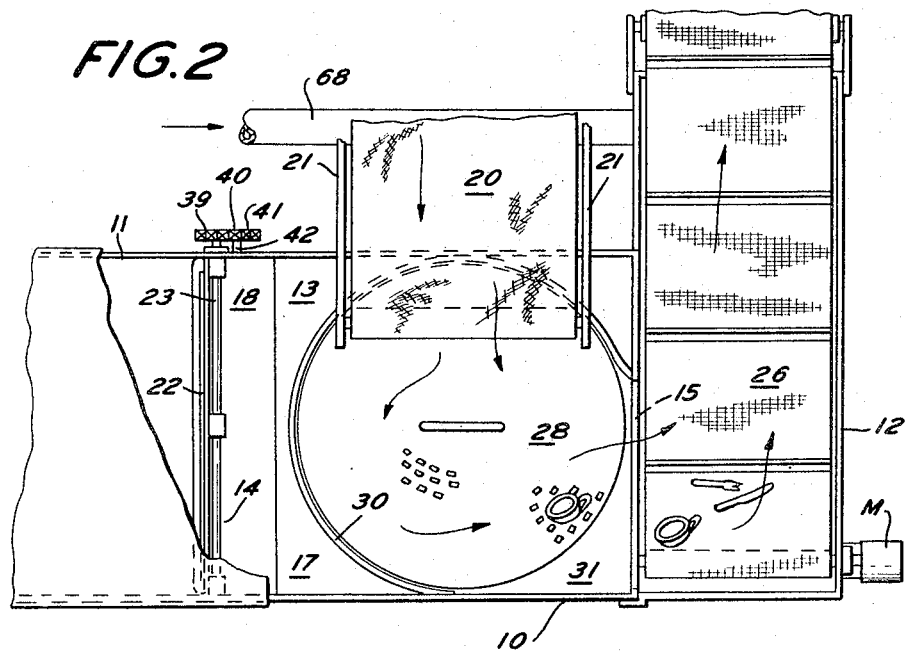
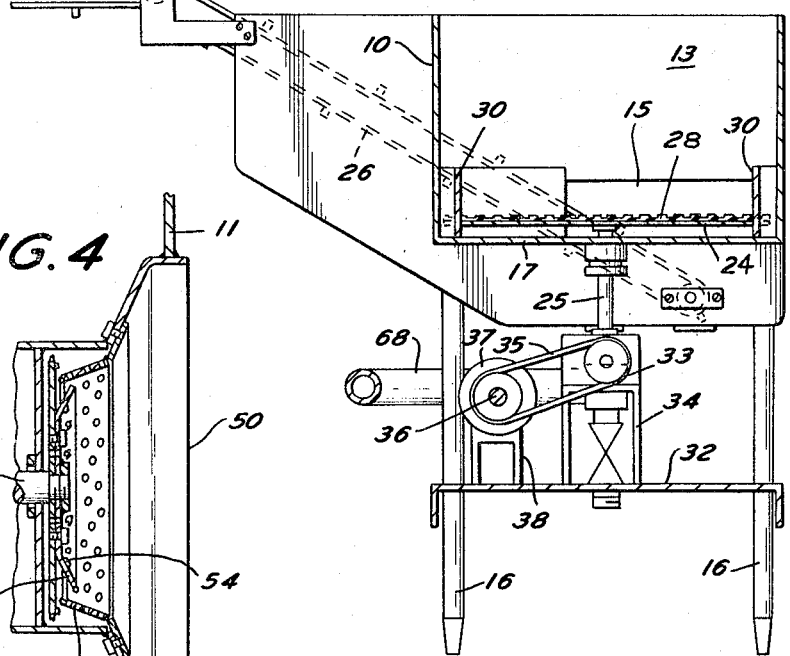
INVENTOR.
KURT WANDEL
BY
ATTORNEYS

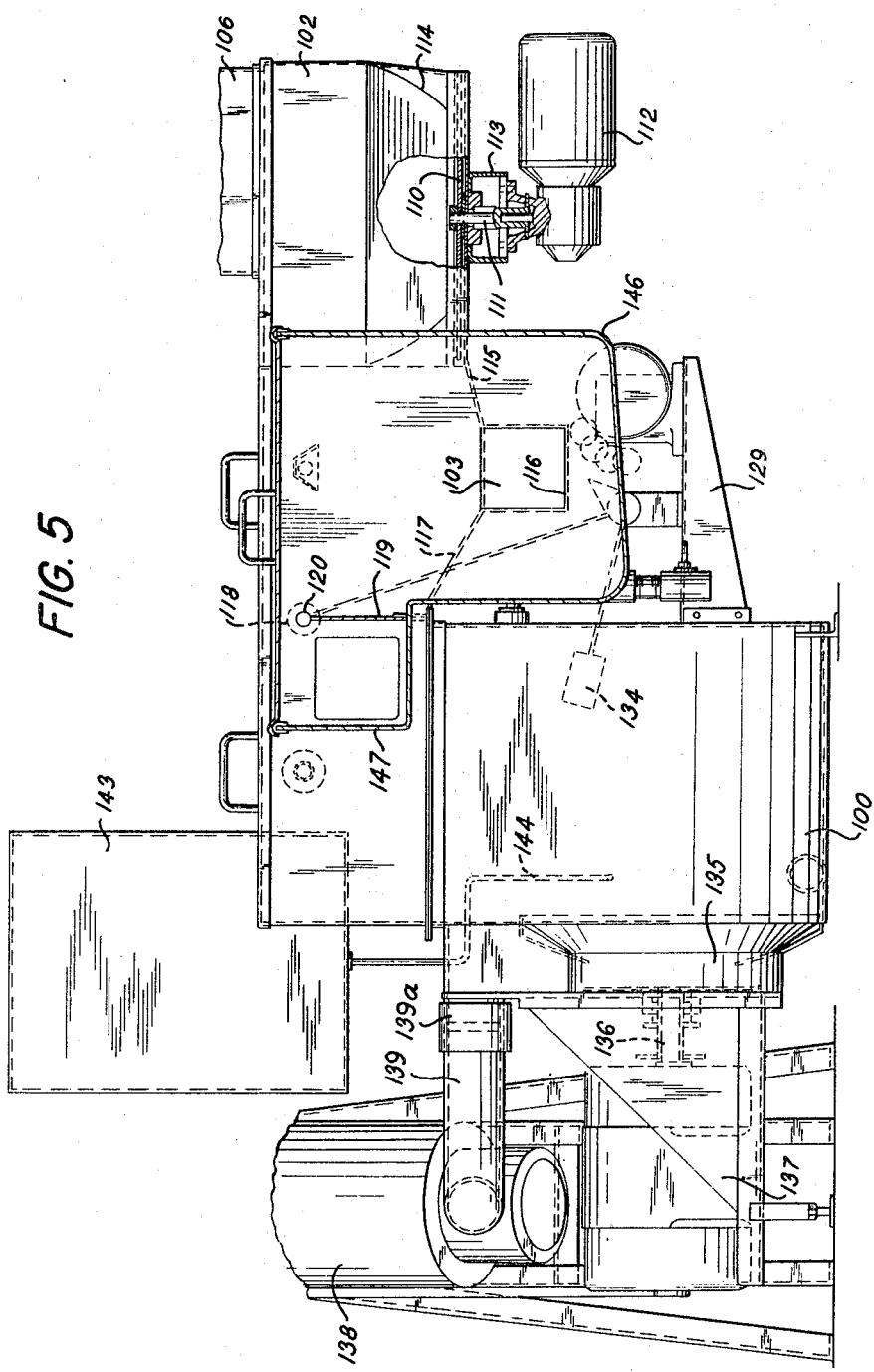

March 21, 1967  K. WANDEL  3,310,241

WASTE DISPOSAL UNIT

Filed Oct. 1, 1963  4 Sheets-Sheet 4

INVENTOR.
KURT WANDEL

BY
Kane, Dalsimer and Kane
ATTORNEYS

United States Patent Office 3,310,241
Patented Mar. 21, 1967

3,310,241
WASTE DISPOSAL UNIT
Kurt Wandel, Downingtown, Pa., assignor to Somat Corporation, Coatesville, Pa., a corporation of Delaware
Filed Oct. 1, 1963, Ser. No. 312,932
13 Claims. (Cl. 241—46)

The present invention relates to waste disposal units and more particularly to a unitary machine for disposing of refuse from dining tables, cafeterias, restaurants and other places, where people are served with food, while at the same time retrieving articles accidentally included in the refuse such as silverware, knives, forks, china cups, plates and saucers.

An object of the invention is to provide a machine wherein garbage containing paper cups, paper plates, paper saucers, and paper napkins together with metal and china utensils can be effectively manipulated to discharge the garbage refuse from one outlet of a receiving tank while separated utensils are discharged from another outlet of the tank to be recovered.

Another object is to provide a waste disposal machine containing a waste disintegrating unit and means for removing sinkable articles in the waste without passing into the disintegrating unit.

To provide other objects as will appear hereinafter.

In the accompanying drawings:

FIG. 1 is a side elevation view, partly broken away, of a waste disposal machine constructed in accordance with the teachings of this invention;

FIG. 2 is a sectional view, on an enlarged scale, taken on line 2—2 in the direction of the arrows in FIG. 1;

FIG. 3 is a sectional view taken on line 3—3 in the direction of the arrows in FIG. 1;

FIG. 4 is a fragmentary sectional view taken on the line 4—4 in the direction of the arrows in FIG. 1;

FIG. 5 is a side elevation view with portions broken away of an alternate form of waste disposal unit also constructed in accordance with the teachings of this invention;

Figure 6:
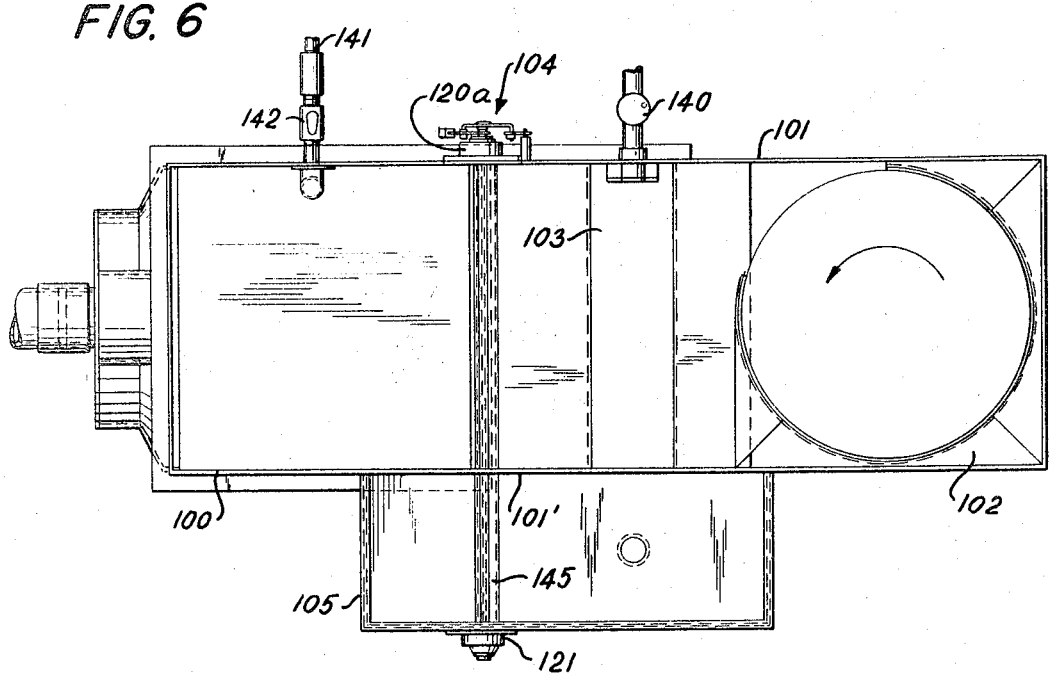
FIG. 6 is a plan view of the waste disposal unit shown in FIG. 5.

In the embodiment of the invention shown in FIGS. 1 through 4, the waste disposal unit 10 comprises a grinding chamber 11 at one end, a transversely disposed trough 12 at the other end, and an open top tank 13 between the two ends. At the side adjacent chamber 11, the tank 13 has a discharge outlet 14 opening into the chamber and at the other side a passage 15 opening into the top of the trough 12. The casing 10 is supported by legs 16, of which those for the tank 13 locate the tank bottom 17 in an elevated position to bring the discharge outlet 14 above the operating level of water in the chamber 11. This water (indicated by dotted lines) is in a closed circulatory system to be hereinafter described. A downwardly inclined ramp 18 forms an extension of the bottom 17 to accelerate the discharge from the bottom of the tank 13.

The open top of the tank 13 is at a level for convenient hand dumping of waste material, or as here shown, by conveyor belt 20 riding between ways 21, which rotatably journal end rollers and driving means in the conventional manner. The discharge end of the belt 20 overlies the open top of the tank 13. The waste material here specifically considered is the debris from dining rooms, restaurants, cafeteria trays and the like, consisting of food remains, garbage, paper cups and improperly contained articles to be rescued, such as silverware, china cups and saucers.

For holding an operative water level in the tank 13, a weighted plate valve 22, attached to horizontal pivot spindle 23, is suspended across the discharge outlet 14, and arranged to be opened and closed in timed relation as will later appear.

As a means for separating returnable articles from the debris, a horizontally disposed disk 24 is mounted in the tank 13 being carried by a vertical shaft 25 journaled in the bottom 17 and supporting the plate 24 in spaced relation to such bottom but in operative alignment with the outlet passage 15 into the trough 12. The articles centrifugally ejected through the passage 15 are received by conveyor 26 rising angularly upward in the trough 12 to discharge at the upper end upon a belt 27 leading to a handling location. The conveyor 26 is roller driven by a motor M in a conventional manner. The upper or contacting face of the disk 24 is covered with a mat 28 of rippled rubber or other friction material.

In order to guide the centrifugally propelled articles to the passage 15, a cylindrical baffle 30, having a diameter substantially equal to the width of the tank 13, rises from the bottom 17 to encircle the major portion of the disk 24 while providing an outlet 31 leading to the passage 15.

The driving mechanism for the disk 24 is mounted in a space provided between the bottom 17 of the tank and platform 32 supported by the legs 16. The disk shaft 25 extends downwardly into this space to enter a speed reduction gear box 33 mounted upon a pedestal 34 which is seated upon the platform 32. Power is supplied to the gear box by pulley belt transmission 35 from the main shaft 36 of motor 37 which is supported by pedestal 38 from the platform 32.

For periodically opening the valve 22, the pivot spindle 23 is keyed to a sprocket 39 driven by chain 40 from second sprocket 41 which is keyed to shaft 42 journalled in bearing members 43 which rise from the platform 32. The shaft 42 has an arm 42′ keyed to it and projecting radially to mount roller 44 to ride upon the periphery of timing cam 45 keyed to a suitably journalled shaft 46. This shaft 46 enters and receives motion from a variable speed reduction unit 47 and bevel gearing 48 driven from the main shaft 36. In the time cycle set by the unit 47, the cam 45 turns clockwise to rock the roller arm 42′ to thereby give the required movement of the chain 40 to open the valve 22 and thus flush the tank 13. When the opening movement is completed the newly positioned cam dwell allows the roller 44 to return by reason of the weighted valve 22 moving to its closed position to retain another batch of debris ready for the next flushing cycle.

When the valve 22 opens, the water laden garbage, paper, paper napkins and cups flush into the chamber 11, where the water level is normally above an outlet 50 which is juxtaposed to an impeller 51 mounted upon a horizontal shaft 52 to rotate within perforated cylinder 53 which serves as a sieve for material disintegrated by the mascerating impeller 51. Preferably the receiving face of the impeller 51 is concave and carries a plurality of discrete projecting carbon cutters 54, as a mascerating means. The impeller 51 is driven by suitable motor means in the supported housing 55. The space about the impeller into which the mascerated material discharges opens into a pipe 56 to be propelled into the bottom of perforated tube 60 of a hydro-extractor, such as shown in applicant's pending application Serial No. 234,652, but somewhat modified for operative association as a part of the present invention.

The housing 57 coaxially mounts screw conveyor 58 within water extracting tube 60 which is circumferentially spaced from the housing 57. The screw conveyor 58 upon rotation moves the mascerated material upwardly and discharges into a header 61 as water passes through the perforations in water extracting tube 60 into the space between tube 60 and housing 57. The screw conveyor is driven by speed reduction unit 62 and belt 63 from a suitably supported motor 64. The substantially dewatered fibrous mulch leaves the header 61 by way of a chute 65 to fall by gravity into a truck, bag or other selected collector.

In the present instance the space between the perforated tube 60 and the housing 57 carries the exuded water downwardly into a discharge pipe 66 leading to the inlet of pump 67. The outlet of the pump 67 opens into a conduit 68 which extends along one side of the casing 10 to enter the trough 12 by way of a two way valve 70 having a dual purpose as a clean-out when necessary. Thus there is a closed circuit circulation of water from the extractor to the garbage receiving tank 13 restoring the water level when the garbage release valve 22 closes. The extractor 57, pump 67 and associated parts are carried by leg supported frame 71.

For maintaining a substantially constant level in the grinding chamber 11 to ensure effective cooperation with the disintegrating impeller 51, a float 72 is carried by a pivoted lever 73 for opening and closing a valve 74 on a water supply pipe 75 from a suitable source. As the level falls, the valve 74 opens to restore the level as will be understood. Any conventional level control can be substituted for the float means shown to obtain a like result.

It will now be apparent that a complete unitary retrieving means for articles, improperly carried, in debris from dining tables has been devised as a coactive part of a waste disposal medium. The novel interrelation of the two assemblies operating upon a batch of waste, such as garbage, paper cups, paper saucers, including accidentally contained silverware and china articles, makes it possible to retrieve and discharge such articles from one portion of the unit while garbage, paper and paper products discharge from another portion of the unit for disintegration as a pulverized mulch or the like.

It should be noted that disk 24 creates a vortex in a substantially horizontal plane above it. The swirling in this vortex aids in the separation and especially where silverware becomes entrapped in the garbage, the vortex tumbles and breaks up the garbage to free the silverware.

In starting the operation of the machine the grinding chamber 11 is filled to the desired level and the impeller 51 and pump 67 are energized thereby returning water from the extractor to the pump 67 which discharges through the pipe 68 into the tank 13 to introduce a relatively low level in such tank. The motor 37 for the disk 24 and cam 45 as well as the motor M for the trough conveyor 26 are now energized and a batch of refuse is dumped into the tank 13. The valve 22 is in closed position at this time and under control of the variable speed reduction unit 47, which is set to define a time interval before reopening in order to permit articles, to be retrieved, to settle upon the rotating face of the disk 24 for centrifugal ejection through the passage 15 to conveyor 26. At the end of the timed interval the cam 45 turns the arm 42' to thereby shift the chain 40 and open the valve 22 so that water laden refuse rushes out of the tank 13 into the grinding chamber 11. This flushing action also clears the water about the baffle 30 by way of the ramp 18. The moment the tank 13 is emptied the valve 22 drops quickly by gravity to closed position thereby allowing the next batch of refuse to rise to the selected discharge level within tank 13 and the segregation of any articles to be recovered.

The flushed refuse delivered to the grinding chamber 11 is disintegrated by the impeller 51 and propelled into the extractor where the screw conveyor 58 coacts with the perforated tube 60 to deliver extracted water into the housing 57 for return to the closed circuit circulation by the pump 67. Thus batches of refuse are successively controlled by a time cycle while retrieved articles are separately carried off by the trough conveyor 26 to a convenient handling location.

Although a conveyor 26 is shown removing the articles to be retrieved, it is within the scope of this invention to provide a tray or other suitable means for removing the articles from the position into which they have been ejected.

Figure 7:
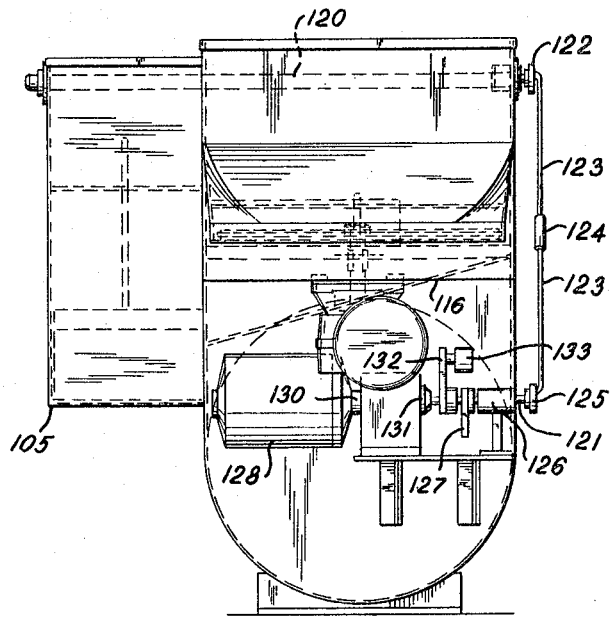
FIG. 7 is an end view from the right of the waste disposal unit shown in FIG. 5.

A second form of the invention is shown in FIGS. 5 through 7. The waste disposing unit as seen in FIG. 6 in plan view, is substantially rectangular and consists of disintegrating unit 100 at one end and tank 101 at the other end consisting of refuse receiving section 102 formed at one end of the tank and intermediate article receiving trough 103. A gating arrangement which will be described below, is indicated in FIG. 6 generally by the numeral 104 and separates tank 101 from the disintegrating section 100. Basket receiving section 105 is attached at one side of the unit.

As seen best in FIG. 5 the refuse receiving section is provided with means 106 for guiding refuse into the unit 102 and contains therein disk 110 of the type previously described which is mounted substantially horizontally and driven in rotary motion about vertical axis 111 by motor 112 through gearing 113. A flume or baffle arrangement 114 provided within the refuse receiving section to guide articles ejected by disk 110 by centrifugal force in a direction to the left as seen in FIG. 5 down inclined surface 115 and into trough 103 which itself is formed with a transverse inclined lower surface 116 so that articles disposed therein are drawn by the force of gravity toward the basket receiving section 105 shown on the left of the unit in FIG. 7. Upwardly sloped surface 117 of the tank terminates at passage or opening 118 in which valve gate 119 is pivotally mounted about horizontal axis 120 and when it is disposed vertically, in the normal condition, it separates tank 101 from disintegrating unit 100.

Gate assembly 104 consisting of valve gate 119 and supporting shaft 120 are rigidly attached and shaft 120 is supported in the tank in bearings indicated in FIG. 6 by the numeral 120a. Shaft 120 is coupled to shaft 121 through actuating arm 122, rods 123, joined by turnbuckle 124 and actuating lever 125. Shaft 121 is rotatably mounted in a bearing support 126 and has rigidly attached thereto gate operating lever or cam 127. Motor 128 is supported on bracket 129 and has affixed to its shaft 130 which is supported in bearing 131 a cam follower arm 132 and a roller cam follower 133. The rotation of the cam follower during a cycle brings it into engagement with cam 127 and as the cam follower is continually rotated it rolls on the surface of cam 127 rotating cam 127 when the roller engages a predetermined portion of the cam follower thereby rotating shaft 121 and shaft 120 through the linkage system rotating gate 119 about its axis clockwise as seen in FIG. 5. Weighted member 134 is attached to shaft 121 so that the gate 119 will be moved to the normally closed position as seen in FIG. 5 when an appropriate portion of the cam and cam follower are in contact allowing movement of the linkage system connecting shafts 120 and 121. In summary therefore, gate 119 is opened by a cam and linkage system driven by motor 128 when the cam and cam follower are in mutual engagement in a predetermined manner. The gate is closed through the force of gravity acting upon weight 134 when the cam and cam follower are in a predetermined disposition allowing the movement. This is a system or arrangement substantially identical to that of the first embodiment.

The disintegrating unit of this second embodiment is substantially identical to that utilized in the first embodiment with disintegrating impeller 135 attached to shaft 136 which is driven by motor 137. In the second embodiment, however, the mascerated material is discharged from disintegrating chamber 100 through a horizontally mounted pipe 139 which is connected to chamber 100 by sleeve 139a and into extractor 138 which separates the mascerated material from the water as is accomplished in the first embodiment discharging the mascerated waste material and returning the water to the system. The sleeve 139a allows the extractor 138 to be installed at an angle within a range about the axis of pipe 139.

In the second embodiment the water is returned from the hydra-extractor in the manner of the first embodiment through the valve 140. A fresh water line 141 is connected through valve 142 to the disintegrating chamber 100 and water level control panel 143 together with tubing 144 disposed within chamber 100 determine and control the action of valve 142 in providing a workable level of water within disintegrating chamber 100 as is accomplished in the embodiment of FIG. 1 through the utilization of floating valve 72.

As described heretofore in the second embodiment, a basket receiving section 105 is provided in adjacency with trough 103 so that articles to be retrieved which are ejected into trough 103 are drawn by gravity force into section 105 and into baskets disposed therein which are not shown but which are of the loose or open mesh type so that the silverware can be readily removed from the unit manually by withdrawal of such a basket and such baskets will not impede the free flow of liquid within chamber 105. It is noted that a gate 145 is provided within unit 105 and rigidly fastened to shaft 120 so that the gate 145 operates in unison with gate 119 under the control of the linkage system controlling shaft 120 and weight 134. A separate gate 145 is provided because of the wall or partition 101′ of tank 101 separating the basket receiving section from tank 101 and unit 100. The basket receiving section as seen best in FIG. 5 is formed with a portion 146 in which the articles are actually received and a portion 147 of lesser depth which is separated from section 146 by gate 145. It should be understood that there is a free flow of water between tank 101 and portion 146 of basket receiving section and also a free flow of water between unit 100 and portion 147 of the basket receiving section when gates 119 and 145 are in the normally closed position. Upon opening gates 119 and 145 in unison, there is a free flow of water between portions 146 and 147 of the basket receiving section as well as between tank 101 and unit 100.

It has been found that such an arrangement eliminates the problem of the formation of undesirable foaming within the basket receiving section.

FIGS. 5 through 7 operate generally in the manner of the unit of FIGS. 1 through 4 with the refuse being disposed within the unit through opening 106 and into the vortex created by the rotation of disk 110 wherein the articles to be retrieved are separated from the refuse and settle on disk 110 from which they are ejected into trough 103 by centrifugal force and drawn into the basket in basket receiving section 105. Upon the buildup of sufficient water within tank 101 and under the control of the timed cycle and motor 128, gates 119 and 145 are opened and the refuse is flushed into the disintegrating chamber 100 where it is mascerated and the mascerated material is fed through tube 139 to hydraextractor 138 where the water is extracted and fed through the openings and returned through the system through valve 140. The batches of refuse are ejected from hydra-extractor 138 in the manner of the first embodiment. It is noted that immediately upon completion of the flushing operation previously described, the gates 119 and 145 are closed in unison through the action of weight 134. It is also noted that a fresh water system is provided in cooperation with the disintegrating unit 100 and control panel 143 and tubing 144 to provide a sufficient level of water in the distintegrating unit through valve 142 to enable the distintegrating unit to operate in a proper manner.

The means for removing the separated articles from the unit as described and shown in the second embodiment can, of course, be modified to include a conveyor or other suitable means in the position shown in the second embodiment.

Thus, among others, the several objects of the invention as aforenoted, are achieved. Obviously, numerous changes in construction and rearrangement of parts might be resorted to without departing from the spirit of the invention as defined by the claims.

Having thus described my invention, I claim:

1. A waste disposal unit for refuse containing sinkable articles, comprising a tank for receiving such refuse, means for providing a level of water in said tank, a horizontally disposed rotatable disk in said tank, means for rotating said disk, an article receiving chamber adjacent said disk for receiving articles ejected from the surface thereof, by centrifugal force upon rotation of such disk, a passage formed in said tank, gate means normally closing said passage, means to open said gate to flush said tank upon the attainment of a predetermined level of water in said tank, and means to close said gate after such flushing.

2. A waste disposal unit for refuse containing sinkable articles, comprising a tank for receiving such refuse, means for providing a level of water in said tank, a first discharge passage provided in said tank, a horizontally disposed rotatable disk in said tank substantially aligned with said first discharge passage, a second discharge passage provided in said tank spaced from said first passage, gate means normally closing said second passage, means to open said gate to flush said tank, upon the attainment of a predetermined level of water in said tank, means for rotating said disk for centrifugal ejection through said first passage of articles settling on said disk and means to close said gate after such flushing.

3. A waste disposal unit in accordance with claim 2 in which the gate is pivotally mounted about a horizontal axis and the means for opening the gate is timed to rotate said gate about said axis after an interval after a prior closing of said gate and the means for closing said gate consists of a weighted member attached thereto to rotate said gate into its original position by gravity force after the passage of flushing water therethrough.

4. A waste disposal unit according to claim 2 wherein a baffle is provided encircling said disk and having an opening into said first passage whereby articles ejected by said disk are directed into said first passage.

5. A waste disposal unit for refuse containing sinkable articles from dining tables, comprising a casing forming a disintegrating unit at one end, a trough at the other end, and an intermediate tank to receive such refuse, said disintegrating unit including a chamber containing water at a predetermined level and a driven cutter impeller in said water to discharge refuse out of said chamber, said tank having an open side, means mounting said tank to discharge through said side into said chamber above the water level, a disk horizontally mounted in said tank, means for rotating said disk, a normally closed plate valve over said open side, means for opening said valve to flush said tank of refuse upon the attainment of a predetermined level of water in said tank, said tank also having a passage in a side in alignment with said disk and communicating with said trough to deliver articles which have been centrifugally ejected from said disk upon rotation of said disk, means to close said valve after a flushing operation, and means to circulate water through said tank and disintegrating unit in a closed circuit.

6. A waste disposal unit according to claim 5 wherein a vortex formed by said disk coacts with said disk to separate trapped paper about said disk and carry it into flushing stream.

7. A waste disposal unit according to claim 5, wherein a hydra-extractor receives distintegrated material from said disintegrating unit with a discharge of extracted water into said water circuit.

8. A waste disposal unit for refuse containing sinkable articles, comprising a tank, means for providing a level of water within said tank, a horizontally disposed rotatable disk in said tank, means for providing refuse in said tank above said disk, means for rotating said disk, an article receiving portion of said tank disposed beneath the horizontal plane of said disk for receiving articles ejected therefrom by centrifugal force, a passage formed in said tank, said passage being above the horizontal plane of said article receiving portion, gate means normally closing said passage, means to open said gate to flush said tank, and means to close said gate after such flushing.

9. A waste disposal unit in accordance with claim 8 in which the gate means consists of a plate valve pivotally mounted in said passage, and the means to open and close said gate consists of a cam operatively connected to said plate valve through linkages with a weighted member affixed thereto for normally biasing said cam to a predetermined position and a motor driven cam follower is provided for actuating said cam to rotate the same against the force of the weighted member at a predetermined position of engagement of said cam and said follower.

10. A waste disposal unit in accordance with claim 8 in which the article receiving portion is disposed transversely between said disk and said passage and guide means are provided within the tank for guiding articles into said portion.

11. A waste disposal unit in accordance with claim 4 in which a third passage is provided in said tank adjacent said article receiving portion leading to an article receiving basket and said article receiving portion is sloped downwardly toward said basket for movement of articles therein by gravity force.

12. A waste disposal unit for refuse containing sinkable articles, comprising a casing forming a disintegrating unit at one end, a tank to receive said refuse at the other end and a transverse trough formed in said tank, said disintegrating unit including a chamber containing water at a predetermined level and a driven cutter impeller in said water to discharge refuse out of said chamber, said tank having an open side adjacent said disintegrating unit, means mounting said tank to discharge through said side into said chamber above the water level, a disk horizontally mounted in said tank, said trough being disposed between said open side and said disk, means for rotating said disk, means for directing articles centrifugally ejected from said disk upon rotation of said disk into said trough, a normally closed plate valve over said open side, means for opening said plate valve to flush said tank of refuse, means to close said valve after a flushing operation, and means to circulate water through said tank and disintegrating unit in a closed circuit.

13. A waste disposal unit in accordance with claim 12 wherein a hydra-extractor receives disintegrated material from said disintegrating unit with a discharge of extracted water into said water circuit.

References Cited by the Examiner
UNITED STATES PATENTS

| 2,265,936 | 12/1941 | Cowles | 259—96 |
| 2,340,720 | 2/1944 | Wells | 241—46 |
| 3,232,425 | 2/1966 | LeVan Hansen | 209—12 |

FOREIGN PATENTS 713,501   8/1954   Great Britain.

WILLIAM W. DYER, JR., *Primary Examiner.*

H. F. PEPPER, JR., *Assistant Examiner.*